(12) United States Patent
Ohtani

(10) Patent No.: US 8,635,323 B2
(45) Date of Patent: Jan. 21, 2014

(54) PARALLEL COMPUTER SYSTEM, JOB SERVER, JOB SCHEDULING METHOD AND JOB SCHEDULING PROGRAM

(75) Inventor: Atsuhisa Ohtani, Tokyo (JP)

(73) Assignee: NEC Corporation, Tokyo (JP)

( * ) Notice: Subject to any disclaimer, the term of this patent is extended or adjusted under 35 U.S.C. 154(b) by 318 days.

(21) Appl. No.: 13/088,456

(22) Filed: Apr. 18, 2011

(65) Prior Publication Data

US 2011/0265092 A1 Oct. 27, 2011

(30) Foreign Application Priority Data

Apr. 21, 2010 (JP) ................................. 2010-097594

(51) Int. Cl.
*G06F 15/173* (2006.01)
(52) U.S. Cl.
USPC .......................................... 709/223; 709/224
(58) Field of Classification Search
USPC ......... 709/200, 203, 205, 208, 223, 224, 225, 709/226, 229; 718/100, 102, 104
See application file for complete search history.

(56) References Cited

U.S. PATENT DOCUMENTS

| | | | | |
|---|---|---|---|---|
| 5,850,539 A * | 12/1998 | Cook et al. ....................... 703/20 |
| 6,760,852 B1 * | 7/2004 | Gulick ............................ 713/324 |
| 6,804,632 B2 * | 10/2004 | Orenstien et al. ............. 702/188 |
| 7,330,983 B2 * | 2/2008 | Chaparro et al. .............. 713/300 |
| 7,885,795 B2 * | 2/2011 | Rasmussen et al. ............... 703/5 |
| 8,132,031 B2 * | 3/2012 | Barsness et al. ............... 713/320 |
| 8,250,389 B2 * | 8/2012 | Archer et al. .................. 713/320 |
| 8,291,427 B2 * | 10/2012 | Archer et al. .................. 718/104 |
| 8,539,270 B2 * | 9/2013 | Archer et al. .................. 713/320 |
| 2004/0264652 A1 * | 12/2004 | Erhart et al. ................. 379/88.01 |
| 2007/0005998 A1 * | 1/2007 | Jain et al. ...................... 713/300 |
| 2007/0198864 A1 * | 8/2007 | Takase .......................... 713/300 |
| 2008/0059555 A1 * | 3/2008 | Archer et al. .................. 709/201 |
| 2009/0307703 A1 * | 12/2009 | Archer et al. .................. 718/104 |
| 2010/0005326 A1 * | 1/2010 | Archer et al. .................. 713/320 |
| 2010/0241881 A1 * | 9/2010 | Barsness et al. ............... 713/320 |
| 2010/0241884 A1 * | 9/2010 | Barsness et al. ............... 713/322 |
| 2012/0204041 A1 * | 8/2012 | Archer et al. .................. 713/300 |
| 2012/0304193 A1 * | 11/2012 | Archer et al. .................. 718/105 |

FOREIGN PATENT DOCUMENTS

JP 2005310139 A 11/2005

* cited by examiner

*Primary Examiner* — Sargon Nano

(57) ABSTRACT

A parallel computer system comprising a node group having numbers of nodes connected by a network, in which a job scheduler of a job server that schedules jobs to be executed by a node of the node group comprises a temperature calculating unit which with a node being used of the node group as an imaginary heat source and with the assumption that a quantity of heat is conducted from the heat source to a surrounding node, calculates a temperature of a surrounding free node based on a distance from the heat source, a free region extracting unit which selects, from a plurality of temperature groups obtained by grouping free nodes on a certain temperature range basis, a temperature group meeting the number of free nodes required by a job according to a temperature and takes out a lowest temperature free node from the selected temperature group as a center node, and a node selecting unit which sequentially selects the necessary number of free nodes starting with a shortest distance free node centered around the center node.

9 Claims, 13 Drawing Sheets

FIG. 6

| DISTANCE / TIME | HEAT SOURCE x=0 | 1 | 2 | 3 | 4 | ... |
|---|---|---|---|---|---|---|
| t=0 | T0 | 0 | 0 | 0 | 0 | |
| 1 | T0 | $(1/\chi)$T0 | 0 | 0 | 0 | |
| 2 | T0 | $(2/\chi)$T0 | $(1/\chi)$T0 | 0 | 0 | |
| 3 | T0 | $(3/\chi)$T0 | $(2/\chi)$T0 | $(1/\chi)$T0 | 0 | |
| 4 | T0 | $(4/\chi)$T0 | $(3/\chi)$T0 | $(2/\chi)$T0 | $(1/\chi)$T0 | |
| ... | | | ........ | | | |

FIG. 13

| 0 | T3 | 0 | 0 | T3 | 0 | 0 |
| T3 | T2 | T3 | 0 | T3 | 0 | 0 |
| T2 | T1 | (T2) | T3+T3 | T2 | T3 | T3 |
| T1 | ■ | T1+T3 | T2+T2 | T3+T1 | T3+T2 | T2+T3 |
| T2+T3 | T1+T3 | T2+T2 | T3+T1 | ■ | T1 | T3+T2 |
| T3 | T2 | T3+T3 | T2 | T1 | T2 | T3 |
| 0 | T3 | 0 | T3 | T2 | T3 | 0 |

PARALLEL COMPUTER SYSTEM, JOB SERVER, JOB SCHEDULING METHOD AND JOB SCHEDULING PROGRAM

INCORPORATION BY REFERENCE

This application is based upon and claims the benefit of priority from Japanese patent application No. 2010-097594, filed on Apr. 21, 2010, the disclosure of which is incorporated herein in its entirety by reference.

TECHNICAL FIELD

The present invention relates to a parallel computer system in which numbers of nodes are connected by a network line and, more particularly, a job server which schedules jobs executed on a parallel computer system, a job scheduling method and a job scheduling program.

BACKGROUND ART

In recent years, it is a common practice for a parallel computer system to improve its performance by increasing the number of nodes rather than increasing the size of each node.

In a parallel computer system in general, computation is executed while transmitting and receiving data between nodes by a network line (interconnect) which connects the nodes. As a method of connecting a network line in this case, while complete connection of directly connecting one arbitrary node and all the other nodes is optimum in terms of communication efficiency, when the number of nodes is increased, this method is not practical because of difficulty in packaging and costs.

Adopted in many cases therefore is a method, with adjacent nodes directly connected with each other, of communicating with nodes provided farther through a plurality of nodes until reaching a target node from an adjacent node. One of such methods is a connection method based on a two-dimensional torus or a three-dimension torus.

In a case of such a connection method, however, communication with an adjacent node directly connected by a network line and communication with a node (far-away node in terms of a network) which should be communicated with through a plurality of nodes differ from each other in time required for communication.

More specifically, it is commonly known that in a connection method based on a two-dimensional torus or a three-dimensional torus, a TAT (Turn Around Time) of a job executed on a parallel computer system might be longer than that in a case of complete connection by which communication with all the nodes is completed in the same time period.

This might be a big problem, taking the fact that the number of nodes will be further increased. Therefore, in a case of executing a job which uses a plurality of nodes on a parallel computer system, as close a node as possible in terms of a network should be selected.

As related art for selecting as close a node as possible in terms of network in a parallel computer system, recited in Patent Literature 1, for example, are determining an unallocated subset from a plurality of HPC (High Performance Computer) nodes and a case where for minimizing a distance between nodes, the best fit is a cube or a sphere depending on a kind of job.

Patent Literature 1, however, fails to recite an actual method of determining an "unallocated subset" in a case where other plurality of jobs being executed already exist, and a node in use and a free node exist together in a parallel computer system.

Patent Literature 1: Japanese Patent Laying-Open No. 2005-310139.

As one example of commonly possible methods is first selecting an arbitrary one node from a set of free nodes and in order to check how many free nodes exist among its surrounding node, scanning the surrounding nodes. When few free nodes exist in the surroundings of the node, another free node should be again selected, which operation should be repeated until an appropriate free region is found. In this case, when the above-described operation is repeated until an appropriate free region is found, labor of $O(n^2)$ (n represents the number of nodes, which is a positive integer) might be cost in some cases.

From the foregoing, the problem to be solved is providing a method of efficiently finding a free region (a region where free nodes exist in abundance) from a two-dimensional torus or a three-dimensional torus space particularly when a plurality of jobs using a plurality of nodes exist.

OBJECT OF THE PRESENT INVENTION

An object of the present invention is to provide a parallel computer system, a job server, a job scheduling method and a job scheduling program which enable, when a job uses a plurality of nodes, a free region (a region where free nodes exist in abundance) to be found efficiently without scanning all the nodes in the surroundings of a certain node.

SUMMARY

According to a first exemplary aspect of the invention, a parallel computer system comprising a node group having numbers of nodes connected by a network, wherein a job scheduler of a job server which schedules jobs to be executed by a node of the node group includes a temperature calculating unit which with a node being used of the node group as an imaginary heat source and with the assumption that a quantity of heat is conducted from the heat source to a surrounding node, calculates a temperature of a surrounding free node based on a distance from the heat source, a free region extracting unit which selects, from a plurality of temperature groups obtained by grouping free nodes on a certain temperature range basis, a temperature group meeting the number of free nodes required by a job according to a temperature and takes out a lowest temperature free node from the selected temperature group as a center node, and a node selecting unit which sequentially selects the necessary number of free nodes starting with a shortest distance free node centered around the center node.

According to a second exemplary aspect of the invention, a job scheduling method in a parallel computer system comprising a node group having numbers of nodes connected by a network, wherein a job scheduler of a job server which schedules jobs to be executed by a node of the node group executes a temperature calculating step of, with a node being used of the node group as an imaginary heat source and with the assumption that a quantity of heat is conducted from the heat source to a surrounding node, calculating a temperature of a surrounding free node based on a distance from the heat source, a free region extracting step of selecting, from a plurality of temperature groups obtained by grouping free nodes on a certain temperature range basis, a temperature group meeting the number of free nodes required by a job according to a temperature and taking out a lowest temperature free node from the selected temperature group as a center node, and a node selecting step of sequentially selecting the necessary number of free nodes starting with a shortest distance free node centered around the center node.

According to a third exemplary aspect of the invention, a job server of a parallel computer system comprising a node group having numbers of nodes connected by a network, includes a job scheduler which schedules jobs to be executed by a node of the node group, wherein the job scheduler includes a distance calculating unit which calculates a distance in terms of a network between the respective nodes of the node group, a temperature calculating unit which with a node being used of the node group as an imaginary heat source and with the assumption that a quantity of heat is conducted from the heat source to a surrounding node, calculates a temperature of a surrounding free node based on a distance from the heat source, a free region extracting unit which selects, from a plurality of temperature groups obtained by grouping free nodes on a certain temperature range basis, a temperature group meeting the number of free nodes required by a job according to a temperature and takes out a lowest temperature free node from the selected temperature group as a center node, and a node selecting unit which sequentially selects the necessary number of free nodes starting with a shortest distance free node centered around the center node.

According to a fourth exemplary aspect of the invention, a computer readable medium storing a job scheduling program executed on a parallel computer system comprising a node group having numbers of nodes connected by a network, the job scheduling program causes a job server that schedules jobs to be executed by a node of the node group to execute a distance calculating processing of calculating a distance in terms of a network between the respective nodes of the node group, a temperature calculating processing of, with a node being used of the node group as an imaginary heat source and with the assumption that a quantity of heat is conducted from the heat source to a surrounding node, calculating a temperature of a surrounding free node based on a distance from the heat source, a free region extracting processing of selecting, from a plurality of temperature groups obtained by grouping free nodes on a certain temperature range basis, a temperature group meeting the number of free nodes required by a job according to a temperature and taking out a lowest temperature free node from the selected temperature group as a center node, and a node selecting processing of sequentially selecting the necessary number of free nodes starting with a shortest distance free node centered around the center node.

According to the present invention, when a job uses a plurality of nodes, a free region (a region where free nodes exist in abundance) can be found efficiently without scanning all the nodes in the surroundings of a certain node.

BRIEF DESCRIPTION OF THE DRAWINGS

FIG. 6 is a diagram showing a conduction state of heat from a heat source;

FIG. 13 is a diagram showing one example of ensuring a node according to the first exemplary embodiment of the present invention.

EXEMPLARY EMBODIMENT

Exemplary embodiment of the present invention will be detailed with reference to the drawings.

First Exemplary Embodiment

Description of Structure

First, an example of an entire structure of a parallel computer system according to a first exemplary embodiment of the present invention will be described with reference to FIG. 1.

Figure 1:
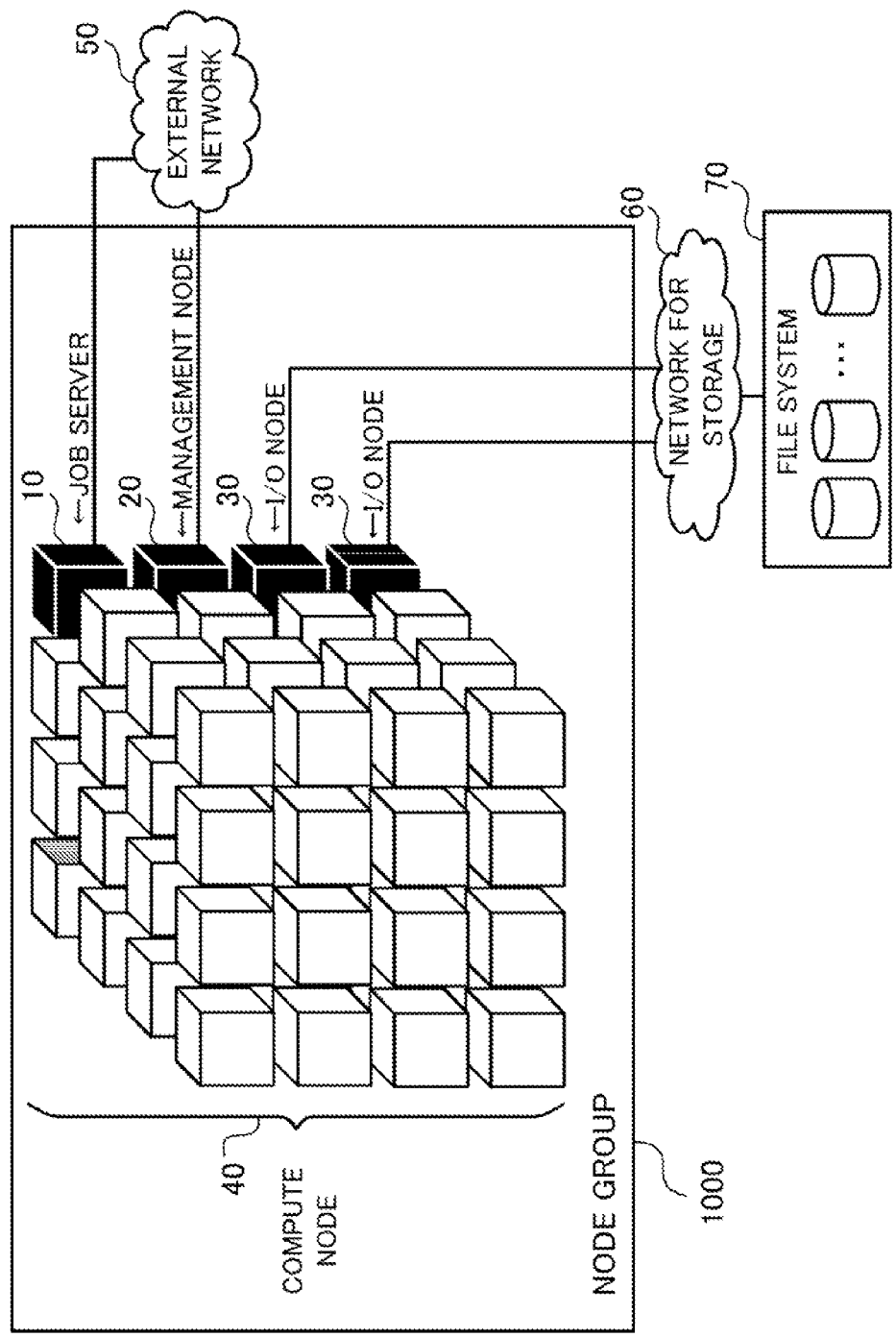
FIG. 1 is a diagram showing an example of an entire structure of a parallel computer system according to a first exemplary embodiment of the present invention.

In the parallel computer system according to the present exemplary embodiment, a node group 1000 is basically expressed as a set of cubes formed of a plurality of nodes connected (three-dimensional torus) with adjacent six-direction nodes by a network line as shown in FIG. 1.

The node group 1000 includes a job server 10, a management node 20, an I/O (Input/Output) node 30 and a compute node 40. Further included are a file system 70, a network 60 for storage and an external network 50.

Figure 2:
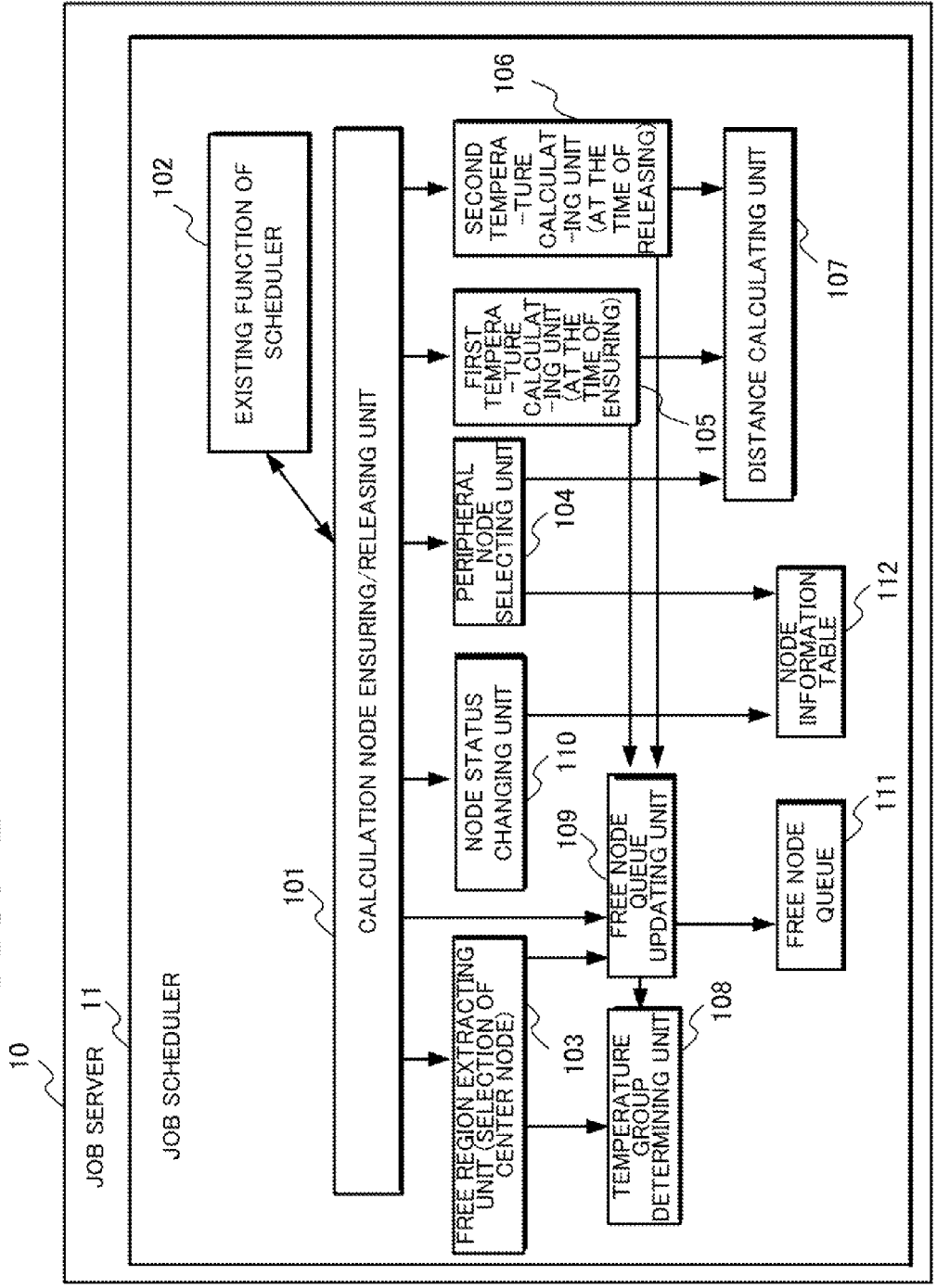
FIG. 2 is a block diagram showing a structure of a job scheduler of a job server of the parallel computer system according to the first exemplary embodiment of the present invention.

The job server 10 is a node in which a job scheduler 11 shown in FIG. 2 operates. The compute node 40 is a node for an end user to execute necessary calculation, which is a node to be scheduled by the job scheduler 11.

The I/O node 30 is in charge of receiving an input/output request from the compute node 40 and transferring the input/output request to the file system 70 through the network 60 for storage.

The file system 70 is in general formed of a plurality of storages. In some cases, a plurality of storage servers which manage a plurality of storages form the file system 70.

The management node 20 is a node into which a system manager logs for maintenance or system setting change to execute working.

Then, an end user enters a job into the job server 10 from an external terminal through the external network 50.

Figure 3:
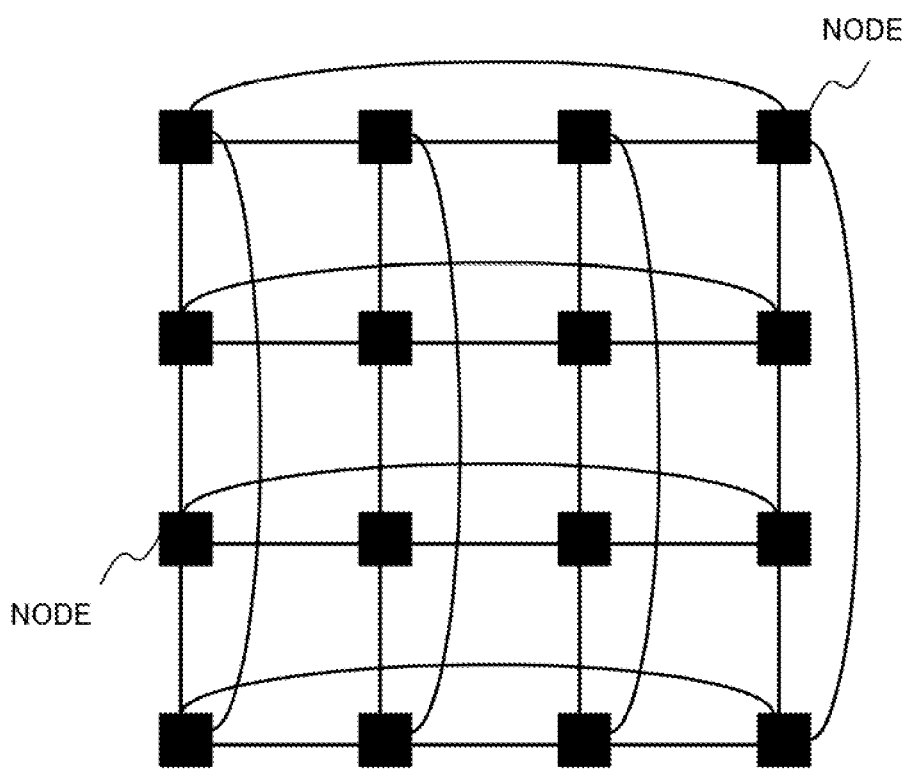
FIG. 3 is a diagram showing an image of an example of connection of a two-dimensional torus as one example of a network line connection form of a node group.

As one example of a connection form of a network line of the node group 1000, an image of a connection example of a two-dimensional torus is shown in FIG. 3. The torus connection is characterized in that a node located at the end is connected to a node located at the opposite end, so that no end exists in terms of a network.

A three-dimensional torus has the same feature as described above with the only difference in having a height direction in addition to the horizontal and vertical directions of the two-dimension. The reason why shown in FIG. 2 is an image of not a three-dimensional but a two-dimensional image is to make the drawing more visible for facilitating understanding.

Figure 4:
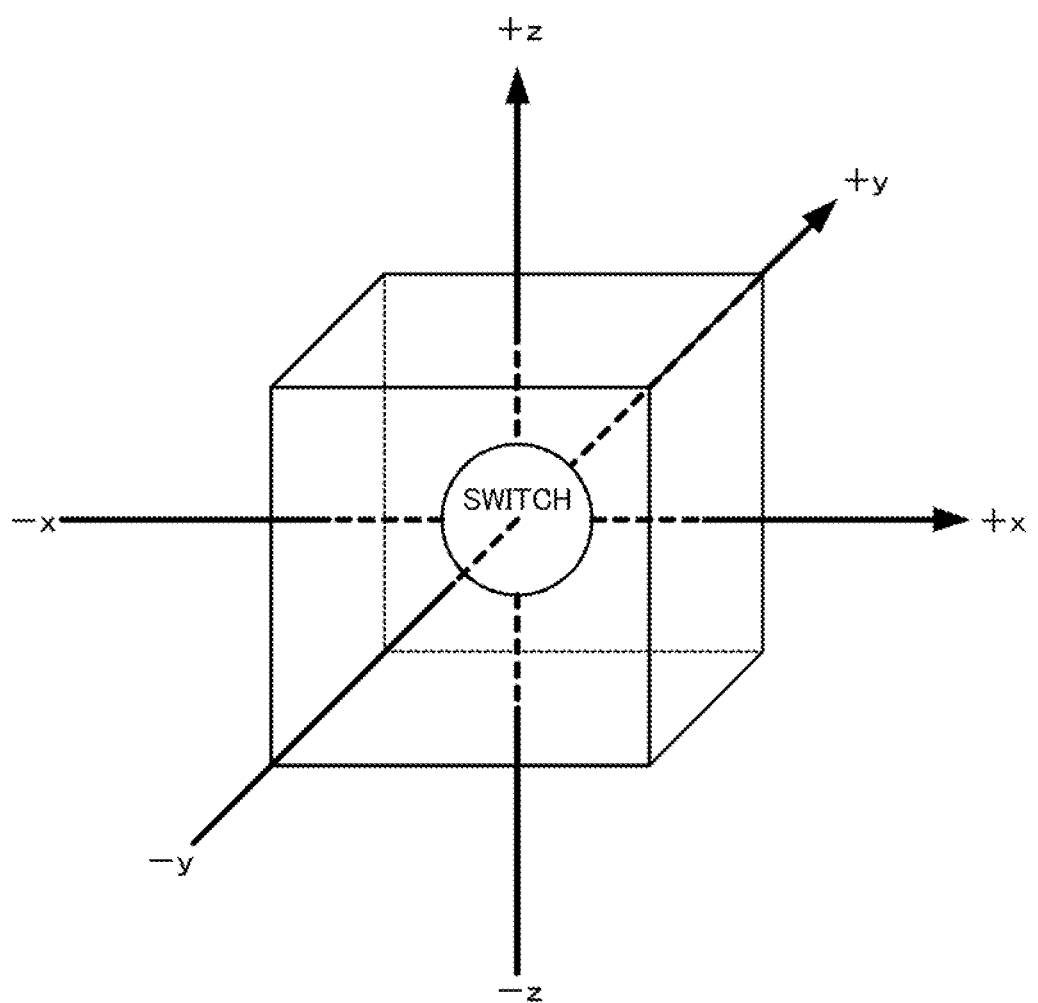
FIG. 4 is a diagram showing an image of connection from each node to an adjacent node in the node group.

An image of connection from each node to an adjacent node in the node group 1000 is shown in FIG. 4. As shown in FIG. 4, each node has a small-sized switch, by which switch the node is directly connected to adjacent nodes in six directions in a case of a three-dimensional torus.

Figure 5:
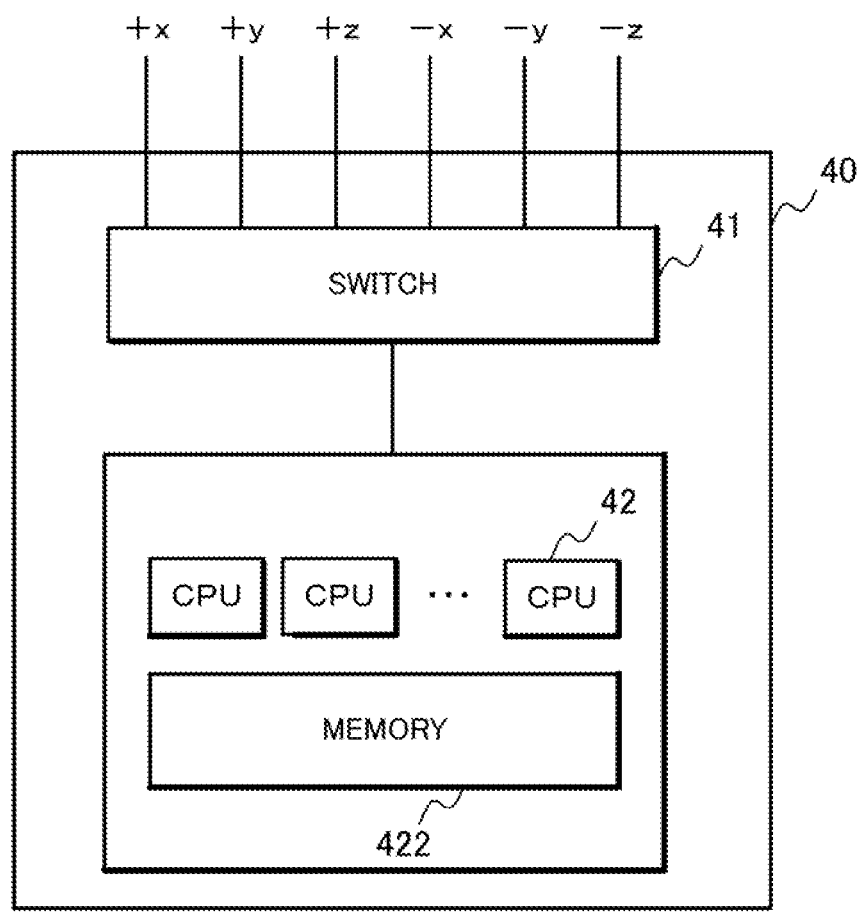
FIG. 5 is a block diagram showing an example of a structure of a compute node of the parallel computer system according to the first exemplary embodiment of the present invention.

An example of a structure of the compute node 40 is shown in FIG. 5. A three-dimensional torus requires a switch 41 of at least seven ports including adjacent six nodes and its own node. In addition, a plurality of calculation units called cores 421 are provided in one or a plurality of CPUs 42, which cores are connected to a memory 422. As an operating system, there are cases where it is transferred to the memory through a network line at the time of activation of a node and where it is stored in an external storage device mounted on each node. In the latter case, an external storage device is added to the structure shown in FIG. 5.

Also as to the job server 10, the management node 20 and the I/O node 30, they have a structure similar to that of the compute node 40 and realize a function inherent to each node by executing, for example, a program stored in an external storage device by the CPU.

In a case of the job server 10, for example, the function of the job scheduler 11 not only realizes its operation in hardware by mounting a circuit part as a hardware part such as an LSI (Large Scale Integration) with a program incorporated but also realizes the same in software by loading a program which provides the function into the memory to execute the same by the CPU.

Other nodes than the compute node 40 have a further network interface for the connection with the external network 50 or the storage network 60.

Next, a free node ensuring method according to the present exemplary embodiment of the present invention will be outlined. For facilitating understanding, not a three-dimensional torus but a two-dimensional torus is used in some of the drawings.

The present exemplary embodiment is premised on that in the processing of ensuring a plurality of free nodes (hereinafter, "node" represents the compute node 40 unless otherwise noted), the job scheduler 11 of the job server 10 first selects one node from a set of free nodes and estimates approximately how many free nodes exist around the node only by referring to information related to the selected node. In a case, for example, where one job needs to ensure a plurality of nodes (compute nodes), for reducing time of communication between these nodes, it is necessary to ensure a node whose distance is as short as possible in terms of a network, so that the job scheduler should be designed to efficiently find a region having a large number of free nodes at that time. For this purpose, the concept of heat conduction is used.

In the present exemplary embodiment, in a case where with a node being used as an imaginary heat source whose temperature T is T0, and with the assumption that heat conducts in proportional to a distance from the heat source to a surrounding free node, temperature of a free node surrounding the heat source is calculated at time t=tn.

Next, in the processing of ensuring a plurality of free nodes by the job scheduler 11, one node is selected from a set of free nodes and it is assumed that when the temperature of the node is high, few free nodes exist in the surroundings and when the temperature is low, many free nodes exist.

More specifically, when the temperature of the selected node is low, its region will be a candidate region from which free nodes are ensured in the three-dimensional torus space. This enables a region whose surroundings highly probably have a large number of free nodes to be extracted without checking whether a free node exists among surrounding nodes.

It should be noted that the present invention employs the concept of heat conduction and handles no heat conduction of an actual substance. Therefore, it is not always necessary to coincide with an actual physical phenomenon.

Heat conduction depends on Fourier's law ($q=-k\,(dT/dx)$) indicative of a temperature gradient. Here, q represents quantity of heat transmitted per unit time, k represents thermal conductivity, T represents temperature and x represents distance.

As one example, shown in the table of FIG. 6 is a temperature obtained on the assumption that a heat source at x=0 is allowed to constantly maintain the temperature T0, and for the facility of understanding, a temperature gradient is constant and heat conducts $1/\chi$ each ($\chi$: appropriate positive real number) every time the time t advances "1".

When a plurality of heat sources exist surrounding a free node, however, a temperature of the free node is assumed to be determined by a total quantity of heat transmitted from the heat sources. Even when a plurality of paths exist from a heat source to a certain free node, it is assumed that heat conducts only from one shortest path among them.

It can be found from the table shown in FIG. 6 that between the temperature T0 of the heat source and a temperature T at an arbitrary distance not less than "1", T0>T should hold. For meeting the condition, with a temperature at the time t=tn (tn: positive integer) as a target, $\chi$ should be selected to satisfy $\chi$>tn. T0 can be an arbitrary positive real number.

Then, a temperature change is proportional to quantity of heat conducted (with q as quantity of heat, c as specific heat and m as mass, $T=q/(c\cdot m)$ holds with the temperature T, so that with c=1 and m=1 here, T will be q), which enables a temperature of a surrounding free node to be determined.

For calculating a temperature in a manner as described above, a distance between the nodes is required. Distance targeted in the present invention is not a so-called Euclidean distance (distance in a space with a curvature of zero which is represented as an x, y and z rectangular coordinate system).

At the time of communication between nodes, it is executed through a network switch disposed in each node. Then, it can be considered that the switching requires finite and fixed time. Therefore, a distance between arbitrary two nodes should be defined based on the number of nodes existing on a path between them.

In the following, description will be made of definition of a distance in the present exemplary embodiment.

The number of switches of nodes passed through from a certain node to a target node is defined here as a distance between two nodes.

Shown as one example is a method of calculating the shortest distance between arbitrary two nodes in a three-dimensional torus space.

In the rectangular coordinate system (x, y, z), the shortest distance d (N1, N2) between coordinates (x1, y1, z1) of a node N1 and coordinates (x2, y2, x2) of a node N2 can be expressed by the Expression (1) with distances of x, y and z components as dx (x1, x2), dy (y1, y2) and dz (z1, z2), respectively.

$$d(N1,N2) = dx(x1,x2) + dy(y1,y2) + dz(z1,z2) \quad (1)$$

Figure 8:
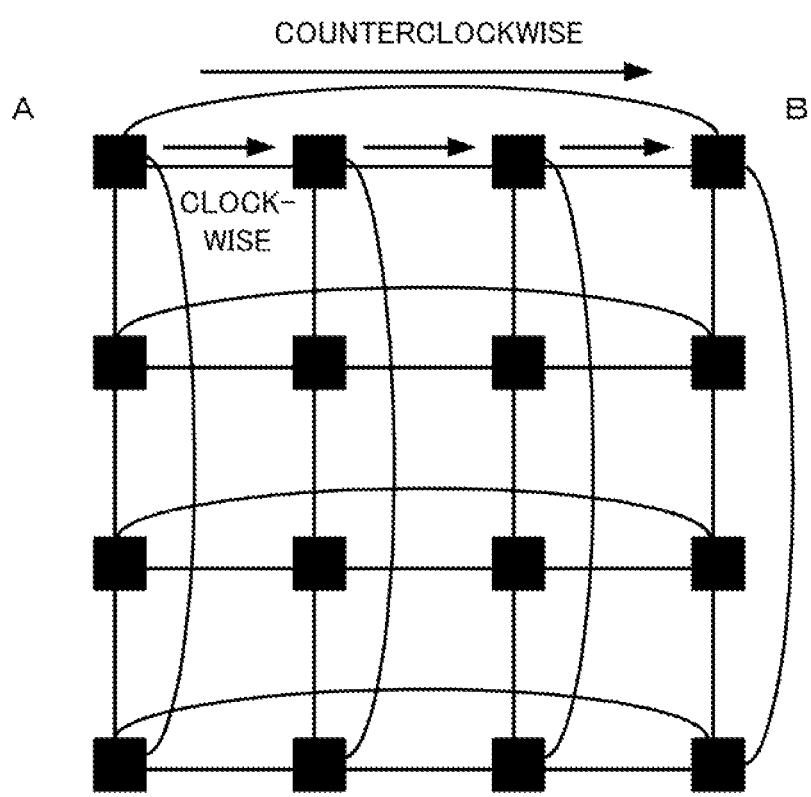
FIG. 8 is a diagram showing an example of clockwise and counterclockwise paths leading from a node A to a node B in a case of a two-dimensional torus.

Here, dx (x1, x2), dy (y1, y2) and dz (z1, z2) can be expressed by the Expressions (2) to (4), respectively. In a case of torus connection, however, since two paths exist, a clockwise path and a counterclockwise path, a shorter one should be selected (see FIG. 8 with respect to a counterclockwise distance). FIG. 8 shows an example of clockwise and counterclockwise paths from a node A to a node B in a case of a two-dimensional torus. In the example of FIG. 8, a clockwise distance is "3", while a counterclockwise distance is "1".

(NUMERICAL EXPRESSION 1)

$$dx(x1, x2) = \begin{cases} |x2 - x2| & (|\overline{x1 - x2}| \geq |x1 - x2|) \\ |\overline{x1 - x2}| & (|\overline{x1 - x2}| < |x1 - x2|) \end{cases} \quad (2)$$

(NUMERICAL EXPRESSION 2)

$$dy(y1, y2) = \begin{cases} |y2 - y2| & (|\overline{y1 - y2}| \geq |y1 - y2|) \\ |\overline{y1 - y2}| & (|\overline{y1 - y2}| < |y1 - y2|) \end{cases} \quad (3)$$

(NUMERICAL EXPRESSION 3)

$$dz(z1, z2) = \begin{cases} |z2 - z2| & (|\overline{z1 - z2}| \geq |z1 - z2|) \\ |\overline{z1 - z2}| & (|\overline{z1 - z2}| < |z1 - z2|) \end{cases} \quad (4)$$

(NUMERICAL EXPRESSION 4)

$|X|, \overline{X}$ which represent an absolute value of X and a counterclockwise distance with X as a clockwise distance between two nodes, respectively.

In addition, with an n-dimensional torus (n is a finite integral value not less than 2) in general not limited to a three-dimensional torus, distance can be calculated basically by the same idea with the only difference in a change in the volume of calculation of d(N1, N2) according to the number of coordinate axes.

Also with respect to other network connection forms (mesh, hyper cube, etc.) than a torus, it is only necessary to define a distance meeting these connection methods without limiting to torus connection.

Next, detailed description will be made of a structure of the job scheduler 11 of the job server 10 of the parallel computer system according to the first exemplary embodiment of the present invention with reference to the drawings.

With reference to FIG. 2, the job scheduler 11 that the job server 10 comprises includes a compute node ensuring/releasing unit 101, an existing function 102 of the scheduler, a free region extracting unit 103, a peripheral node selecting unit 104, a first temperature calculating unit 105, a second temperature calculating unit 106, a distance calculating unit 107, a temperature group determining unit 108, a free node queue updating unit 109, a node status changing unit 110, a free node queue 111 and a node information table 112.

These components substantially operate in a manner as described in the following.

The compute node ensuring/releasing unit 101 executes entire control such as extraction of a free region, ensuring/releasing of a necessary node and recalculation of a temperature of a surrounding free node based thereon.

The existing function 102 of the scheduler is an existing function of a scheduler, which is a common function that a scheduler in general has such as queuing of jobs entered by a user, ordering based on a calculation resource or priority required by each job, transmission of necessary program or data to an ensured compute node, activation of the program, control of return of a calculation result at the end of calculation, failure monitoring and the like. No description will be made of these functions in the present invention.

The free region extracting unit 103 controls the temperature group determining unit 108 to select a temperature group meeting a requested number of nodes and controls the free node queue updating unit 109 to take out one free node from the top of the free node queue 111 of the temperature group.

Since the free node queue 111 is sequentially linked with nodes starting with a lowest temperature node, the top of the queue corresponds to the lowest temperature free node in the temperature group. Then, refer the taken out node as a center node to consider that it is highly probable that an appropriate free region exists on the periphery of the center node.

With the selected center node as the center, the peripheral node selecting unit 104 sequentially selects a necessary number of free nodes from among surrounding nodes and returns the selected nodes to the compute node ensuring/releasing unit 101.

Since at the start of the job, the temperature of the node ensured in the free node ensuring processing is fixed to T0, the surrounding node temperature will be accordingly increased to some extent. The first temperature calculation unit 105 recalculates an increase of the surrounding node temperature at the start of the job.

When the job ends, the temperatures of the node released in the processing of releasing the used node and its surrounding node will be decreased to some extent. The second temperature calculating unit 106 recalculates a decrease of the surrounding node temperature at the end of the job.

The distance calculating unit 107 has a function of calculating a distance in terms of a network. Since calculation of a temperature is executed based on a distance, distance calculation will be required. Distance calculation by the distance calculating unit 107 is executed based on the calculation method described above as one example.

Figure 7:
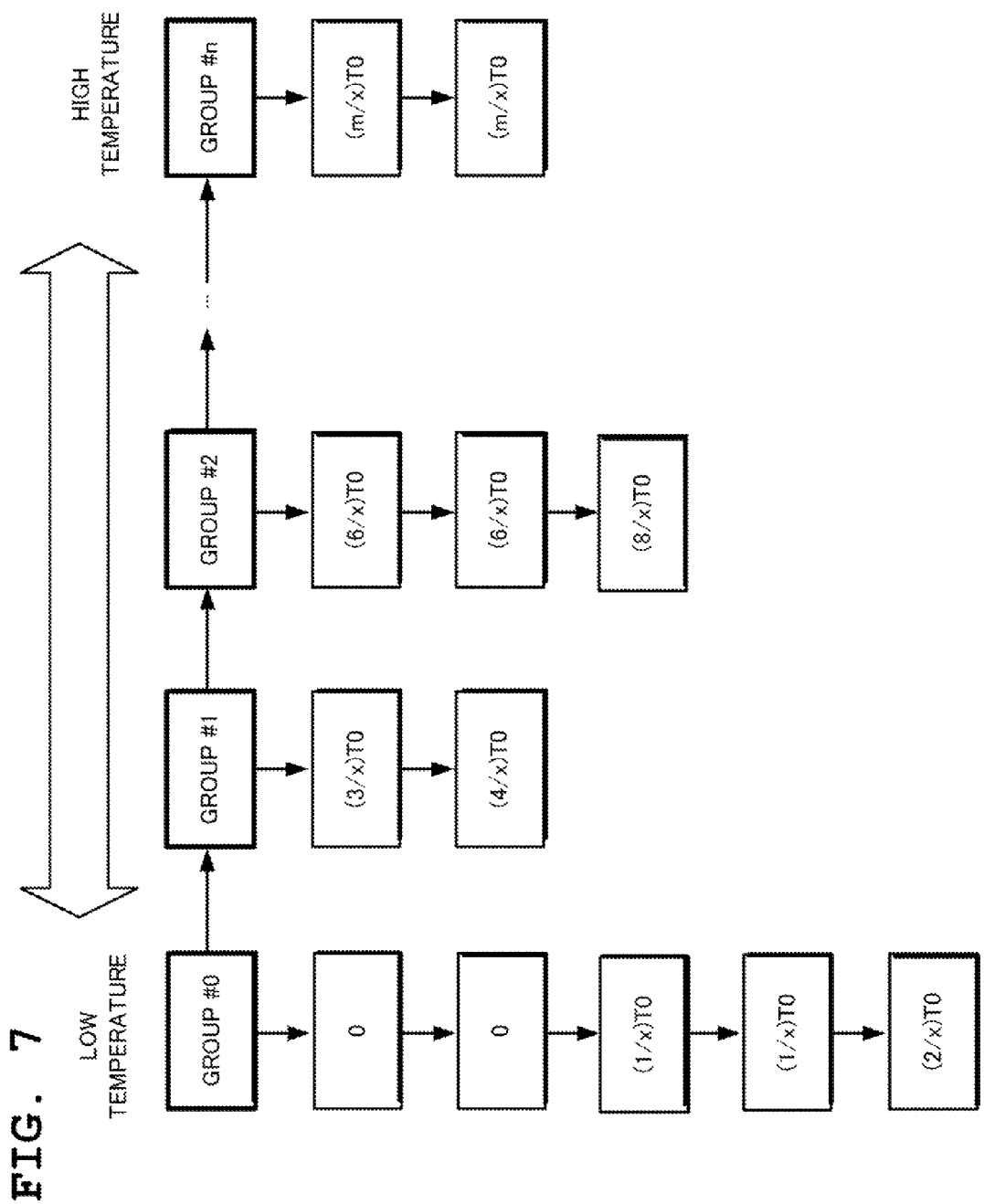
FIG. 7 is a diagram showing an example of a free node queue according to the first exemplary embodiment of the present invention.

The temperature group determining unit 108 groups temperatures of free nodes on a certain range basis in the free node queue 111 and selects a temperature group meeting the number of the compute nodes 40 required by the job as shown in FIG. 7. Then, the free region extracting unit 103 controls the free node queue updating unit 109 to select a center node (node at the center of the free region) from the selected temperature group.

This is because when the number of free nodes required is not so large, selecting a node whose temperature is the lowest as a center node results in selecting a place having unnecessarily large free region in its surroundings as a center node. As a result, a following job which requires more nodes might not be allowed to ensure an enough free region.

In the present exemplary embodiment, the free node queue 111 is classified into a plurality of temperature groups, so that the temperature group determining unit 108 selects a temperature group according to the required number of nodes. This prevents a center node from being ensured in a place where an unnecessarily large free region exists.

At the time of insertion of a node, when the node is a free node, the free node queue updating unit 109 controls the temperature group determining unit 108 to select a temperature group according to the temperature of the node and inserts the node into a queue in the temperature group. Queue insertion position at this time is set to have the nodes linked in the queue in an ascending order of a temperature.

At the time of node deletion, the free node queue updating unit 109 controls the temperature group determining unit 108 to specify a temperature group and delete the node from the free node queue 111 of the temperature group.

The node status changing unit 110 changes a status of a node to be ensured or released by the control of the compute node ensuring/releasing unit 101 at the time of ensuring or releasing the node.

As shown in FIG. 7, the free node queue 111 is linked with a pointer to a free node of each temperature group in an ascending order of temperature, which is updated by the free node queue updating unit 109.

The node information table 112 holds information of each node such as a status of each node and a temperature of the compute node 40. Details thereof will be described later.

(Description of Operation)

Next, operation of the present exemplary embodiment of the present invention will be detailed.

The job server 10, the compute node 40, the management node 20 and the I/O node 30 are premised on using UNIX or Linux as their operating systems and the nodes except for the compute node 40 have a network interface allowed to use a common communication protocol such as TCP/IP other than an interconnect of a three-dimensional torus or the like.

First, the job scheduler 11 ensures a region for storing the node information table 112 on a memory of the job server 10. The node information table 112 is a three-dimensional array (in a case of a three-dimensional torus) which holds information of each compute node 40.

This array has, for each element, information of a node status (indicative of a state of a node such as "RUN" (in use), "FREE (free), "MAINTENANCE" (maintenance), "BROKEN" (failure), etc.), a kind of node (compute node, job server, I/O node, management node, etc.), a coordinate position of a node, a job ID of a job being executed and node temperature. Suffixes (i, j, k) of the three-dimensional array directly correspond to a coordinate position of each node. Also assumed that based on the table shown in FIG. 6, a value of a temperature at each distance at time t=tn (tn: appropriate positive integer) is ensured on the memory of the job server 10 as a one-dimensional array $T_{tn}(x)$.

(Operation to be Executed when Starting Job)

Figure 9:
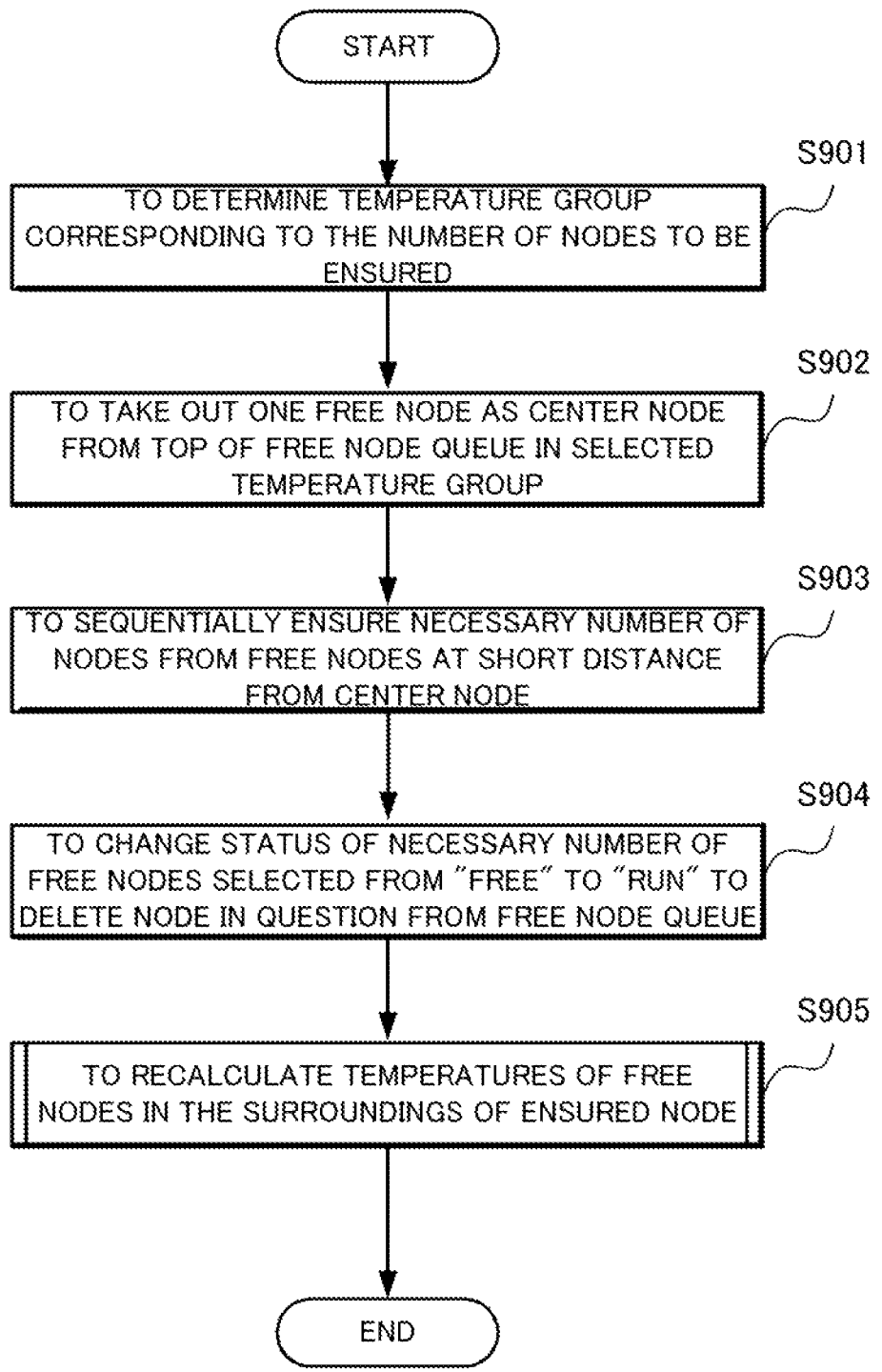
FIG. 9 is a flow chart for use in explaining operation executed when ensuring a compute node at the time of starting a job according to the first exemplary embodiment of the present invention.
Figure 10:
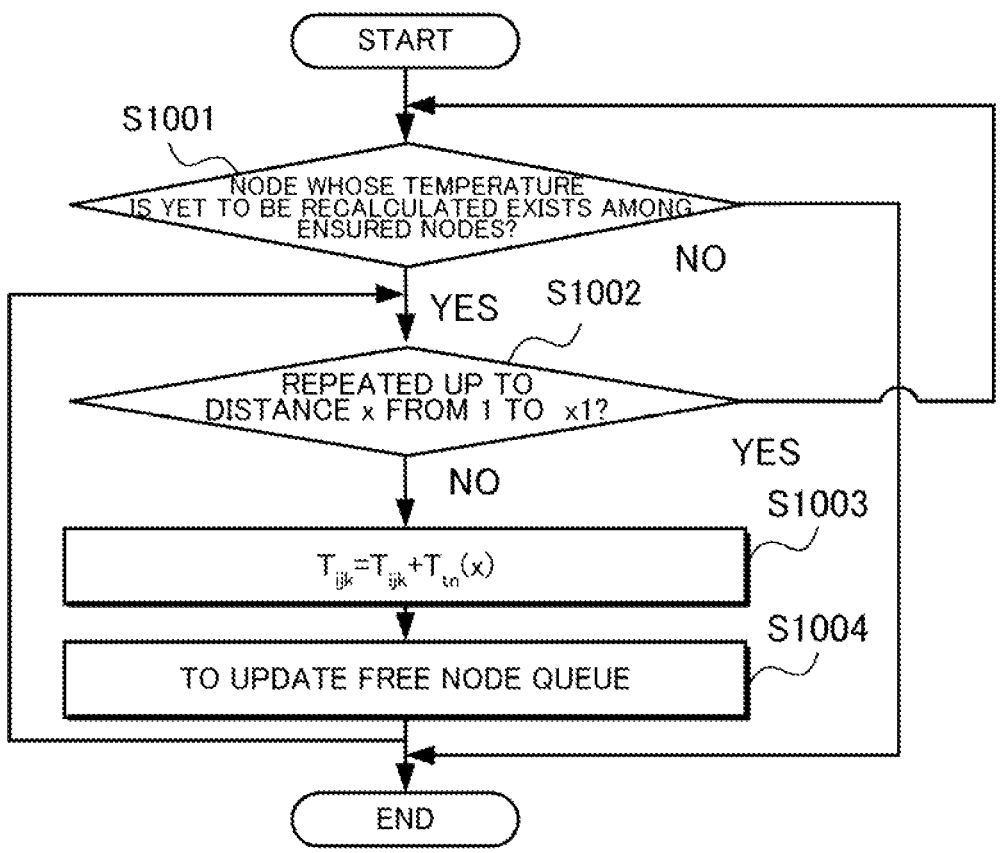
FIG. 10 is a flow chart for use in explaining operation executed by a first temperature calculating unit to recalculate temperatures of a node ensured and a free node in its surroundings.

FIG. 9 and FIG. 10 are flow charts for use in explaining operation to be executed when ensuring the compute node 40.

First, the existing function 102 of the scheduler transfers the number of nodes required for the processing of a job selected as a job whose execution should be started next to the compute node ensuring/releasing unit 101.

At Step S901 and Step S902 in FIG. 9, the compute node ensuring/releasing unit 101 controls the free region extracting unit 103 to select a center mode.

At this time, the free region extracting unit 103 controls the temperature group determining unit 108 to determine an appropriate temperature group from the free node queue 111 according to the number of nodes required for the processing of the job (Step S901). Various methods are possible as a method of determining the temperature group, which include, for example, constantly selecting the lowest temperature group when the required number of nodes is not less than a fixed number (the number of nodes set as an upper limit) and selecting the highest temperature group conversely when the required number of nodes is not more than a fixed number (the number of nodes set as a lower limit). Then, when the required number of nodes is in the middle, possible is a method of determining a group according to proportional distribution based on a relationship between the number of temperature groups and the required number of nodes.

Then, the free region extracting unit 103 controls the free node queue updating unit 109 to take out one free node as a center node from the top of a node queue in the selected temperature group (Step S902).

Next, at Step S903 and Step S904, the compute node ensuring/releasing unit 101 controls the peripheral node selecting unit 104 to sequentially ensure the necessary number of nodes from among free nodes at a short distance centered around the taken out center node (Step S903).

In addition, the compute node ensuring/releasing unit 101 controls the node status changing unit 110 to change the status of the required number of nodes ensured from "FREE" to "RUN" and controls the free node queue updating unit 109 to delete these nodes from the free node queue 111 (Step S904).

Next, the compute node ensuring/releasing unit 101 controls the first temperature calculating unit 105 to recalculate temperatures of the ensured node and a free node surrounding the same (Step S905).

Processing of recalculating the temperature is shown in FIG. 10. The compute node ensuring/releasing unit 101 controls the first temperature calculating unit 105 and with respect to an ensured node, calculates a temperature of a node located in the range of the distance x from 1 to x1 as $T_{ijk}=T_{ijk}+T_{tn}(x)$ (Steps S1001 to S1003). Here, $T_{ijk}$ represents a temperature of a node at coordinates (i, j, k). When recalculation of the temperatures of all the ensured nodes is completed, the node ensuring/releasing unit 101 controls the free node queue updating unit 109 to update the free node queue 111 based on the new recalculated temperature (Step S1004).

Lastly, the compute node ensuring/releasing unit 101 transfers the ensured node to the existing function 102 of the scheduler.

In the flow chart shown in FIG. 10, a temperature of a node being used is also recalculated for convenience' sake. Since whether the node is being used or not is determined according to whether a status of the node is "RUN" or "FREE", no temperature of a node being used will be referred to, so that no problem will occur.

One example for ensuring a node is shown in FIG. 13. When already ensured nodes are two nodes and temperature calculation will be executed up to the distance of 3 for the simplicity of description, a temperature of each free node will be as shown in the drawing. Ti here is assumed to be a temperature caused by a quantity of heat conducted from a node being used at a distance of i. Black square represents a node being used and a white square represents a free node. It is assumed that the temperature is T1>T2>T3>0.

Assume here that nine nodes are newly ensured. Assuming that a top of a queue of a temperature group corresponding to nine nodes is a node with the ○ mark, this will be a center node. Then, one example of a case where the remaining eight nodes are ensured starting with a node whose distance from the center node is the shortest is a node indicated by a heavy line. In this case, all the nodes are considered to be ensured within the distance of 2.

If no temperature group is used and a node whose temperature is 0 as the lowest temperature is simply selected as a center node, it can be found that although it is as a matter of course possible to ensure the necessary number of nodes, an unnecessarily large free region will be selected.

(Operation to be Executed when Ending Job)

Figure 11:
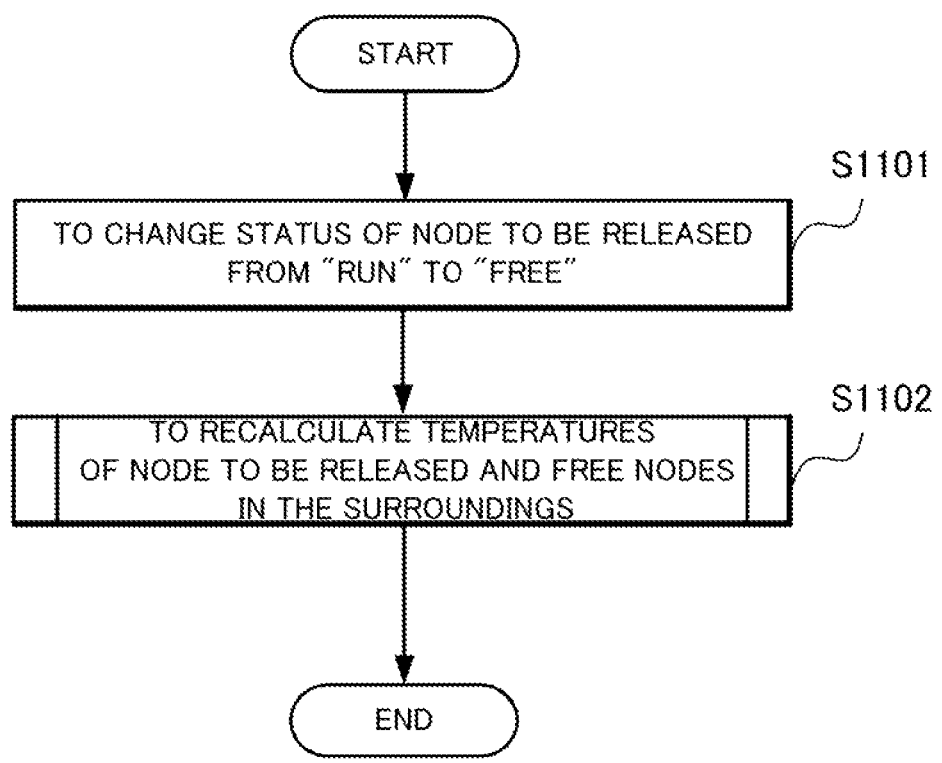
FIG. 11 is a flow chart for use in explaining operation executed when a compute node is released at the end of a job according to the first exemplary embodiment of the present invention.
Figure 12:
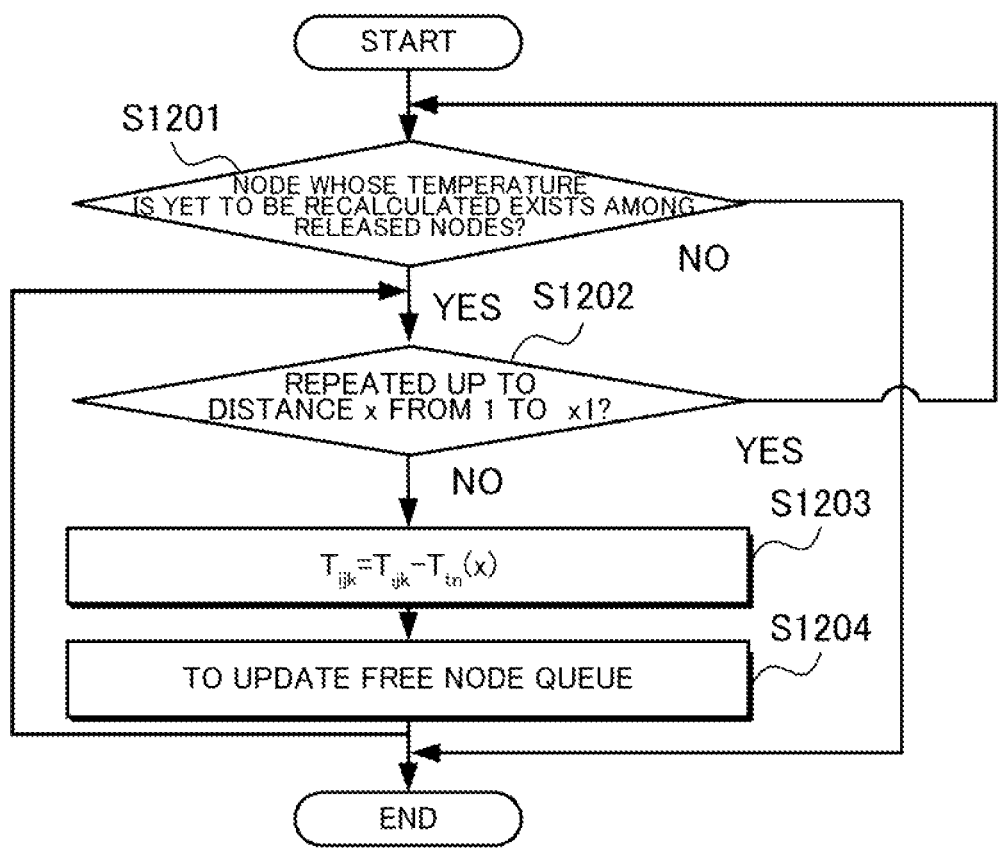
FIG. 12 is a flow chart for use in explaining operation executed when a second temperature calculating unit recalculates temperatures of a node released and a free node in its surroundings.

FIG. 11 and FIG. 12 are flow charts for use in explaining operation to be executed when the compute node 40 is released.

First, the existing function 102 of the scheduler transfers a coordinate position of a node ensured by a job whose execution is completed to the compute node ensuring/releasing unit 101.

At Step S1101 in FIG. 11, the compute node ensuring/releasing unit 101 controls the node status changing unit 110 to change the status of a node to be released from "RUN" to "FREE".

Next, at Step S1102, the compute node ensuring/releasing unit 101 controls the second temperature calculating unit 106 to recalculate temperatures of the node to be released and free nodes in its surroundings.

The processing of recalculating the temperature is shown in FIG. 12. The compute node ensuring/releasing unit 101 controls the second temperature calculating unit 106 and with respect to a node to be released, calculates a temperature of a node located in the range of the distance x from 1 to x1 as $T_{ijk}=T_{ijk}-T_{tn}(x)$ (Steps S1101 to S1103). When recalculation of the temperatures of all the nodes to be released is completed, the node ensuring/releasing unit 101 controls the free node queue updating unit 109 to update the free node queue 111 based on a new temperature (Step S1104).

Assume that at the time of reference/addition/updating to each array or queue, consistency is maintained by exclusive control.

Effects of the First Exemplary Embodiment

Effects of the above-described first exemplary embodiment will be described in the following.

First, for finding a free region of a node, referring to a temperature of a certain node without scanning and checking all the nodes surrounding the node enables estimation whether free nodes exist in abundance in the surroundings or not, so that when there exist a plurality of jobs using a plurality of nodes, a free region (region where free nodes exist in abundance) can be found efficiently from a three-dimensional torus space, for example.

Secondly, since free nodes in the vicinity of a center node are sequentially ensured, at the time of starting a job, setting a center node to be a master of MPI (Message Passing Interface) and the remaining nodes to be slaves, for example, enables a distance from the master to each slave to be the shortest to reduce a communication time.

Although the present invention has been described with respect to the exemplary embodiment in the foregoing, the present invention is not necessarily limited to the above-described exemplary embodiment. The structure and the details of the present invention allow various modifications understandable by those skilled in the art without departing from the scope of the present invention.

The whole or part of the exemplary embodiments disclosed above can be described as, but not limited to, the following supplementary notes.

(Supplementary note 1) A parallel computer system comprising a node group having numbers of nodes connected by a network, wherein a job scheduler of a job server which schedules jobs to be executed by a node of the node group comprising:

a temperature calculating unit which with a node being used of the node group as an imaginary heat source and with the assumption that a quantity of heat is conducted from the heat source to a surrounding node, calculates a temperature of a surrounding free node based on a distance from the heat source;

a free region extracting unit which selects, from a plurality of temperature groups obtained by grouping free nodes on a certain temperature range basis, a temperature group meeting the number of free nodes required by a job according to a temperature and takes out a lowest temperature free node from the selected temperature group as a center node; and a node selecting unit which sequentially selects the necessary number of free nodes starting with a shortest distance free node centered around the center node.

(Supplementary note 2) The parallel computer system according to Supplementary note 1, wherein the job scheduler comprises a distance calculating unit which calculates a distance in terms of a network between the respective nodes of the node group, and a node ensuring/releasing unit which controls the entire unit to ensure or release a node necessary for executing a job from the node group.

(Supplementary note 3) The parallel computer system according to Supplementary note 1 or Supplementary note 2, wherein the job scheduler comprises a free node queue linked with a pointer to a free node in an ascending order of temperature on a temperature group basis, and a temperature group determining unit which determines and selects a temperature group meeting the required number of free nodes from the free node queue by the control of the free region extracting unit.

(Supplementary note 4) The parallel computer system according to Supplementary note 3, wherein the job scheduler comprises a free node queue updating unit which inserts a free node into a free node queue of a temperature group according to a temperature of the free node or deletes the free node from the free node queue according to ensuring or releasing of the free node.

(Supplementary note 5) The parallel computer system according to any one of Supplementary note 1 through Supplementary note 4, wherein the job scheduler further comprises a node status changing unit which changes a status of a node to be ensured or released at the time of ensuring or releasing the node, and a node information table which holds information of each node including a status of each node of the node group and a temperature of the node.

(Supplementary note 6) The parallel computer system according to any one of Supplementary note 3 through Supplementary note 5, wherein the compute node ensuring/releasing unit controls the temperature calculating unit to, at the time of ensuring a node, recalculate temperatures of the ensured node and a surrounding free node, as well as, at the time of releasing a node, recalculating temperatures of the node to be released and a surrounding free node, and controls the free node queue updating unit to update the free node queue based on a calculated temperature.

(Supplementary note 7) A job scheduling method in a parallel computer system comprising a node group having numbers of nodes connected by a network, wherein a job scheduler of a job server which schedules jobs to be executed by a node of the node group executes a temperature calculating step of, with a node being used of the node group as an imaginary heat source and with the assumption that a quantity of heat is conducted from the heat source to a surrounding node, calculating a temperature of a surrounding free node based on a distance from the heat source, a free region extracting step of selecting, from a plurality of temperature groups obtained by grouping free nodes on a certain temperature range basis, a temperature group meeting the number of free nodes required by a job according to a temperature and taking out a lowest temperature free node from the selected temperature group as a center node, and a node selecting step of sequentially selecting the necessary number of free nodes starting with a shortest distance free node centered around the center node.

(Supplementary note 8) The job scheduling method according to Supplementary note 7, wherein the job scheduler further executes a distance calculating step of calculating a distance in terms of a network between the respective nodes of the node group.

(Supplementary note 9) The job scheduling method according to Supplementary note 7 or Supplementary note 8, wherein the free region extracting step includes a temperature group determining step of determining and selecting a temperature group meeting the required number of free nodes from a free node queue linked with a pointer to a free node in an ascending order of temperature on a temperature group basis.

(Supplementary note 10) The job scheduling method according to Supplementary note 9, wherein the job scheduler includes a free node queue updating step of inserting a free node into a free node queue of a temperature group according to a temperature of the free node or deleting the free node from the free node queue according to ensuring or releasing of the free node.

(Supplementary note 11) The job scheduling method according to any one of Supplementary note 7 through Supplementary note 10, wherein the job scheduler includes a node status changing step of changing a status of a node to be ensured or released at the time of ensuring or releasing a node, and a step of holding information of each node including a status of each node of the node group and a temperature of the node in a node information table.

(Supplementary note 12) The job scheduling method according to any one of Supplementary note 9 through c Supplementary note 11, wherein at the temperature calculating step, at the time of ensuring a node, temperatures of the ensured node and a surrounding free node are recalculated, while at the time of releasing a node, temperatures of the node to be released and a surrounding free node are recalculated, and at the free node queue updating step, the free node queue is updated based on a calculated temperature.

(Supplementary note 13) A job server of a parallel computer system comprising a node group having numbers of nodes connected by a network, comprising:

a job scheduler which schedules jobs to be executed by a node of the node group, wherein the job scheduler comprises a distance calculating unit which calculates a distance in terms of a network between the respective nodes of the node group, a temperature calculating unit which with a node being used of the node group as an imaginary heat source and with the assumption that a quantity of heat is conducted from the heat source to a surrounding node, calculates a temperature of a surrounding free node based on a distance from the heat source, a free region extracting unit which selects, from a plurality of temperature groups obtained by grouping free nodes on a certain temperature range basis, a temperature group meeting the number of free nodes required by a job according to a temperature and takes out a lowest temperature free node from the selected temperature group as a center node, and a node selecting unit which sequentially selects the necessary number of free nodes starting with a shortest distance free node centered around the center node.

(Supplementary note 14) The job server according to Supplementary note 13, wherein the job scheduler comprises a distance calculating unit which calculates a distance in terms of a network between the respective nodes of the node group, and a node ensuring/releasing unit which controls the entire unit to ensure or release a node necessary for executing a job from the node group.

(Supplementary note 15) The job server according to Supplementary note 13 or Supplementary note 14, wherein the job scheduler comprises a free node queue linked with a pointer to a free node in an ascending order of temperature on a temperature group basis, and a temperature group determining unit which determines and selects a temperature group meeting the required number of free nodes from the free node queue by the control of the free region extracting unit.

(Supplementary note 16) The job server according to Supplementary note 15, wherein the job scheduler comprises a free node queue updating unit which inserts a free node into a free node queue of a temperature group according to a temperature of the free node or deletes the free node from the free node queue according to ensuring or releasing of the free node.

(Supplementary note 17) The job server according to any one of Supplementary note 13 through claim 16, wherein the job scheduler comprises a node status changing unit which changes a status of a node to be ensured or released at the time of ensuring or releasing the node, and a node information table which holds information of each node including a status of each node of the node group and a temperature of the node.

(Supplementary note 18) The job server according to any one of Supplementary note 15 through Supplementary note 17, wherein the compute node ensuring/releasing unit controls the temperature calculating unit to, at the time of ensuring a node, recalculate temperatures of the ensured node and a surrounding free node, as well as, at the time of releasing a node, to recalculate temperatures of the node to be released and a surrounding free node, and controls the free node queue updating unit to update the free node queue based on a calculated temperature.

(Supplementary note 19) A job scheduling program executed on a parallel computer system comprising a node group having numbers of nodes connected by a network, which causes a job server that schedules jobs to be executed by a node of the node group to execute a distance calculating processing of calculating a distance in terms of a network between the respective nodes of the node group, a temperature calculating processing of, with a node being used of the node group as an imaginary heat source and with the assumption that a quantity of heat is conducted from the heat source to a surrounding node, calculating a temperature of a surrounding free node based on a distance from the heat source, a free region extracting processing of selecting, from a plurality of temperature groups obtained by grouping free nodes on a certain temperature range basis, a temperature group meeting the number of free nodes required by a job according to a temperature and taking out a lowest temperature free node from the selected temperature group as a center node, and a node selecting processing of sequentially selecting the necessary number of free nodes starting with a shortest distance free node centered around the center node.

(Supplementary note 20) The job scheduling program according to Supplementary note 19, which causes the job server to execute a distance calculating processing which calculates a distance in terms of a network between the respective nodes of the node group, and a node ensuring/releasing processing which controls the entire unit to ensure or release a node necessary for executing a job from the node group.

(Supplementary note 21) The job scheduling program according to Supplementary note 19 or Supplementary note 20, wherein the free region extracting processing includes a temperature group determining processing of determining and selecting, from a free node queue linked with a pointer to a free node in an ascending order of temperature on a temperature group basis, a temperature group meeting the required number of free nodes.

(Supplementary note 22) The job scheduling program according to Supplementary note 21, which causes the job server to execute a free node queue updating processing of inserting a free node into a free node queue of a temperature group according to a temperature of the free node or deleting the free node from the free node queue according to ensuring or releasing of the free node.

(Supplementary note 23) The job scheduling program according to any one of Supplementary note 19 through c Supplementary note 22, which causes the job server to execute a node status changing processing of changing a status of a node to be ensured or released at the time of ensuring or releasing the node, and a processing of holding information of each node including a status of each node of the node group and a temperature of the node in a node information table.

(Supplementary note 24) The job scheduling program according to any one of Supplementary note 21 through Supplementary note 23, wherein in the temperature calculating processing, at the time of ensuring a node, temperatures of the ensured node and a surrounding free node are recalculated, while at the time of releasing a node, temperatures of the node to be released and a surrounding free node are recalculated, and in the free node queue updating processing, the free node queue is updated based on a calculated temperature.

INDUSTRIAL APPLICABILITY

The present invention is applicable to such a parallel computer as realizes a large amount of calculations which cannot be executed in a practical time by a single node or a single CPU in such field as HPC (High Performance Computing) through division of a calculation unit into numbers of nodes.

What is claimed is:

1. A parallel computer system comprising a node group having numbers of nodes connected by a network, wherein
a job scheduler of a job server which schedules jobs to be executed by a node of said node group comprising:
a temperature calculating unit which with a node being used of said node group as an imaginary heat source and with an assumption that a quantity of heat is conducted from a heat source to a surrounding node, calculates a temperature of a surrounding free node based on a distance from the heat source;
a free region extracting unit which selects, from a plurality of temperature groups obtained by grouping free nodes on a certain temperature range basis, a temperature group meeting the number of free nodes required by a job according to a temperature and takes out a lowest temperature free node from the selected temperature group as a center node; and
a node selecting unit which sequentially selects the necessary number of free nodes starting with a shortest distance free node centered around said center node.

2. The parallel computer system according to claim 1, wherein said job scheduler comprises
a distance calculating unit which calculates a distance in terms of a network between the respective nodes of said node group, and
a node ensuring/releasing unit which controls the entire unit to ensure or release a node necessary for executing a job from said node group.

3. The parallel computer system according to claim 1, wherein said job scheduler comprises
a free node queue linked with a pointer to a free node in an ascending order of temperature on a temperature group basis, and
a temperature group determining unit which determines and selects a temperature group meeting the required number of free nodes from said free node queue by the control of said free region extracting unit.

4. The parallel computer system according to claim 3, wherein said job scheduler comprises
a free node queue updating unit which inserts a free node into a free node queue of a temperature group according to a temperature of the free node or deletes the free node from the free node queue according to ensuring or releasing of the free node.

5. The parallel computer system according to claim 1, wherein said job scheduler further comprises
a node status changing unit which changes a status of a node to be ensured or released at the time of ensuring or releasing the node, and
a node information table which holds information of each node including a status of each node of said node group and a temperature of the node.

6. The parallel computer system according to claim 3, wherein said compute node ensuring/releasing unit
controls said temperature calculating unit to, at the time of ensuring a node, recalculate temperatures of the ensured node and a surrounding free node, as well as, at the time of releasing a node, recalculating temperatures of the node to be released and a surrounding free node, and controls said free node queue updating unit to update said free node queue based on a calculated temperature.

7. A job scheduling method in a parallel computer system comprising a node group having numbers of nodes connected by a network, wherein a job scheduler of a job server which schedules jobs to be executed by a node of said node group executes a temperature calculating step of, with a node being used of said node group as an imaginary heat source and with an assumption that a quantity of heat is conducted from a heat source to a surrounding node, calculating a temperature of a surrounding free node based on a distance from the heat source, a free region extracting step of selecting, from a plurality of temperature groups obtained by grouping free nodes on a certain temperature range basis, a temperature group meeting the number of free nodes required by a job according to a temperature and taking out a lowest temperature free node from the selected temperature group as a center node, and a node selecting step of sequentially selecting the necessary number of free nodes starting with a shortest distance free node centered around said center node.

8. A job server of a parallel computer system comprising a node group having numbers of nodes connected by a network, comprising:

a job scheduler which schedules jobs to be executed by a node of said node group, wherein said job scheduler comprises a distance calculating unit which calculates a distance in terms of a network between the respective nodes of said node group, a temperature calculating unit which with a node being used of said node group as an imaginary heat source and with an assumption that a quantity of heat is conducted from a heat source to a surrounding node, calculates a temperature of a surrounding free node based on a distance from the heat source, a free region extracting unit which selects, from a plurality of temperature groups obtained by grouping free nodes on a certain temperature range basis, a temperature group meeting the number of free nodes required by a job according to a temperature and takes out a lowest temperature free node from the selected temperature group as a center node, and a node selecting unit which sequentially selects the necessary number of free nodes starting with a shortest distance free node centered around said center node.

9. A non-transitory computer readable medium storing a job scheduling program executed on a parallel computer system comprising a node group having numbers of nodes connected by a network, said job scheduling program causes a job server that schedules jobs to be executed by a node of said node group to execute a distance calculating processing of calculating a distance in terms of a network between the respective nodes of said node group, a temperature calculating processing of, with a node being used of said node group as an imaginary heat source and with an assumption that a quantity of heat is conducted from a heat source to a surrounding node, calculating a temperature of a surrounding free node based on a distance from the heat source, a free region extracting processing of selecting, from a plurality of temperature groups obtained by grouping free nodes on a certain temperature range basis, a temperature group meeting the number of free nodes required by a job according to a temperature and taking out a lowest temperature free node from the selected temperature group as a center node, and a node selecting processing of sequentially selecting the necessary number of free nodes starting with a shortest distance free node centered around said center node.

* * * * *